(12) United States Patent
Nakamura

(10) Patent No.: US 8,593,124 B2
(45) Date of Patent: *Nov. 26, 2013

(54) SWITCHING POWER SOURCE APPARATUS

(75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 213 days.

This patent is subject to a terminal disclaimer.

(21) Appl. No.: 13/209,808

(22) Filed: Aug. 15, 2011

(65) Prior Publication Data

US 2012/0043949 A1 Feb. 23, 2012

(30) Foreign Application Priority Data

Aug. 19, 2010 (JP) ................................. 2010-184011

(51) Int. Cl.
G05F 1/00 (2006.01)

(52) U.S. Cl.
USPC .......................................... 323/284; 323/288

(58) Field of Classification Search
USPC ................... 323/282, 284, 285, 288, 299, 271
See application file for complete search history.

(56) References Cited

U.S. PATENT DOCUMENTS

| 6,583,610 | B2 | 6/2003 | Groom et al. | |
|---|---|---|---|---|
| 8,310,219 | B2 * | 11/2012 | Kuroyabu et al. | 323/271 |
| 2006/0113976 | A1 * | 6/2006 | Bernardon | 323/282 |

FOREIGN PATENT DOCUMENTS

JP 2008-72891 3/2008

OTHER PUBLICATIONS

U.S. Appl. No. 13/150,624, filed Jun. 1, 2011, Nakamura.
U.S. Appl. No. 13/184,663, filed Jul. 18, 2011, Nakamura.
U.S. Appl. No. 13/194,068, filed Jul. 29, 2011, Nakamura.

* cited by examiner

*Primary Examiner* — Timothy J Dole
*Assistant Examiner* — Ivan Laboy Andino
(74) *Attorney, Agent, or Firm* — Oblon, Spivak, McClelland, Maier & Neustadt, L.L.P.

(57) ABSTRACT

A switching power source apparatus includes a high-side MOSFET 11, a ramp generator 18 to generate a ramp signal, an amplitude signal generator (second feedback controller 2) to generate an amplitude signal Comp corresponding to an amplitude of the ramp signal, and a first feedback controller 1 to control the ON timing of the high-side MOSFET 11 according to the ramp signal, a feedback signal FB, and a first reference voltage REF and control the ON width of the high-side MOSFET 11 according to the amplitude signal Comp. The ramp generator 18 controls the inclination of the ramp signal so that the ramp signal maintains a predetermined amplitude. The first feedback controller 1 controls the ON width of the high-side MOSFET 11 so that the ON width does not become narrower than a predetermined limit value.

6 Claims, 14 Drawing Sheets

SWITCHING POWER SOURCE APPARATUS

BACKGROUND OF THE INVENTION

1. Field of the Invention

The present invention relates to a switching power source apparatus for supplying a stable DC voltage.

2. Description of Related Art

A DC-DC converter for supplying a source voltage to a digital signal processing LSI such as an image engine or a CPU is required to have an improved load response to minimize variation in an output voltage when the LSI dynamically changes its load. To meet the requirement, some DC-DC converter employs an error amplifier to compare an output voltage with a reference voltage. The error amplifier, however, causes a delay that may deteriorate the load response of the DC-DC converter. To avoid the delay caused by the error amplifier, a device that is widely used is a ripple converter employing no error amplifier, and instead, adopting PFM (pulse frequency modulation) control to improve load response with respect to a load variation in the digital device.

A PFM ripple converter according to a related art detects a ripple voltage in an output voltage, and to obtain a sufficient ripple signal, employs as an output capacitor an electrolytic capacitor having a large ESR (equivalent series resistance). Due to the large ESR, the electrolytic capacitor hinders compactness of the ripple converter.

To deal with this problem, U.S. Pat. No. 6,583,610 (Patent Document 1) and Japanese Unexamined Patent Application Publication No. 2008-72891 (Patent Document 2) disclose a technique of superposing a ramp signal, which assumes a ripple to be produced by ESR, on a feedback voltage or reference voltage, to secure stable operation even when a ceramic capacitor having a small ESR is used as an output capacitor.

FIG. 1 is a circuit diagram illustrating a switching power source apparatus prepared according to the teachings of Patent Documents 1 and 2 and FIG. 2 is a timing chart illustrating operation of the apparatus of FIG. 1. With reference to FIGS. 1 and 2, operation of the switching power source apparatus employing the conventional ON-width-fixed ripple control technique will be explained. The technique disclosed in Patent Documents 1 and 2 superposes a ramp signal on a feedback signal. This technique is operationally equivalent to superposing a ramp signal on a reference voltage, and therefore, the apparatus and operation of FIGS. 1 and 2 will be explained in connection with superposing a ramp signal on a reference voltage because it is convenient when explaining embodiments of the present invention.

In FIG. 1, a ramp generator 18 generates a ramp signal Ramp, which assumes a ripple signal to be produced by ESR, and outputs the ramp signal Ramp to a superposing circuit 3. The superposing circuit 3 superposes the ramp signal Ramp on a first reference voltage REF, to generate a second reference voltage REF2 having a positive inclination and output the same to a positive input terminal of a feedback comparator 4.

A negative input terminal of the feedback comparator 4 receives a feedback voltage FB. The feedback voltage FB is produced by dividing an output voltage Vout by feedback voltage dividing resistors 16 and 17. If the feedback voltage FB is lower than the second reference voltage REF2, the feedback comparator 4 immediately outputs a signal FB_TRG to a one-shot circuit 5a.

In response to the signal FB_TRG, the one-shot circuit 5a outputs a signal ON_TRG having a predetermined time width to a terminal Set of an ON timer 7b.

A feedforward circuit 6b maintains a predetermined switching frequency even if an input voltage Vin and the output voltage Vout change. For this, the feedforward circuit 6b detects the input voltage Vin and output voltage Vout, generates a feedforward signal Iton that is proportional to the input voltage Vin and inversely proportional to the output voltage Vout, and outputs the feedforward signal Iton to a terminal Adj of the ON timer 7b.

The ON timer 7b uses as a trigger the signal ON_TRG from the one-shot circuit 5a and outputs a signal Ton corresponding to the feedforward signal Iton to a drive logic 8. The larger the feedforward signal Iton, the narrower the time width of the signal Ton.

Based on the signal Ton from the ON timer 7b, the drive logic 8 outputs a drive signal Hon for a high-side driver 9 and a drive signal Lon for a low-side driver 10. The drive logic 8 detects, from a signal SW, that a regenerative period ends and the polarity of a current IL passing through an inductor 13 inverts, and then, changes the drive signal Lon from high to low to turn off a low-side MOSFET 12, thereby preventing the inductor current IL from excessively passing in a reverse manner and avoiding a useless loss.

In response to the signal Hon from the drive logic 8, the high-side driver 9 drives a gate of a high-side MOSFET 11, to supply energy through the inductor 13 to an output capacitor 14 and output load 15.

In response to the signal Lon from the drive logic 8, the low-side driver 10 drives a gate of the low-side MOSFET 12, to turn on the low-side MOSFET 12 in a regenerative period of the inductor current IL after the high-side MOSFET 11 is turned off, thereby reducing a conduction loss.

In this way, the switching power source apparatus of FIG. 1 turns on the high-side MOSFET 11 as soon as the output voltage Vout decreases due to a sudden change in an output load current Iout from light load to heavy load, thereby improving a load response.

In addition, the apparatus of FIG. 1 enables a ceramic capacitor of low ESR to be used as an output capacitor, which the related-art ripple control technique is unachievable.

SUMMARY OF THE INVENTION

The technique of superposing a ramp signal having a given inclination on the feedback voltage FB or reference voltage REF according to Patent Documents 1 and 2, however, has a problem. A change in the output load current Iout results in changing the switching frequency of the high-side MOSFET 11 and the amplitude of the ramp signal Ramp. This results in changing the output voltage Vout, to deteriorate a load regulation that is an important characteristic of the DC-DC converter. This will be explained in detail with reference to the timing chart of FIG. 2.

When the output load current Iout suddenly changes from heavy load to light load, the output voltage Vout momentarily jumps, and thereafter, decreases as time passes. When the feedback signal FB decreases below a peak of the second reference voltage REF2 on which the ramp signal Ramp is superposed, the one-shot circuit 5a outputs the ON trigger signal ON_TRG to turn on the high-side MOSFET 11. However, the smaller the output load current Iout, the longer the ON timing of the high-side MOSFET 11 delays. Namely, the lower the output load current Tout, the lower the switching frequency of the high-side MOSFET 11.

When the switching frequency of the high-side MOSFET 11 decreases, the amplitude of the ramp signal Ramp superposed on the first reference voltage REF increases, and therefore, the second reference voltage REF2 becomes larger than that under heavy load. This results in deteriorating the load regulation characteristic of the switching power source apparatus.

As illustrated in FIG. 2, the output voltage Vout sharply drops when the light load changes to heavy load and does not recover thereafter. This means that there is a large voltage difference ΔVL between light load and heavy load, to deteriorate the load regulation characteristic of the switching power source apparatus.

To improve the load regulation characteristic, the amplitude of the ramp signal Ramp superposed on the second reference voltage REF2 must be reduced. This, however, destabilizes operation because the output capacitor 14 used in this switching power source apparatus is a ceramic capacitor of low ESR.

In recent years, the switching power source apparatus is required, in view of energy saving, to realize high efficiency in a light load state. To improve efficiency of the switching power source apparatus under light load, a widely used technique is reducing the number of switching operations under light load to minimize a switching loss. This technique becomes one of the essential techniques the switching power source apparatus must employ.

In consideration of the problems of the related art, the present invention provides a switching power source apparatus capable of improving efficiency under light load, stably operating even with an output capacitor of small ESR, and securing a good load regulation characteristic.

According to an aspect of the present invention, the switching power source apparatus includes a high-side switch connected to an input voltage, a ramp signal generator configured to generate a ramp signal in synchronization with a switching frequency of the high-side switch, an amplitude signal generator configured to generate an amplitude signal corresponding to an amplitude of the ramp signal, and a controller configured to control the ON timing of the high-side switch according to the ramp signal, a feedback signal, and a first reference voltage and control the ON width of the high-side switch according to the amplitude signal. The ramp signal generator controls, according to the amplitude signal, the inclination of the ramp signal so that the ramp signal maintains a predetermined amplitude. The controller controls the ON width of the high-side switch so that the ON width does not become narrower than a predetermined limit value.

DESCRIPTION OF PREFERRED EMBODIMENTS

Switching power source apparatuses according to embodiments of the present invention will be explained in detail with reference to the drawings.

Embodiment 1

Figure 1:
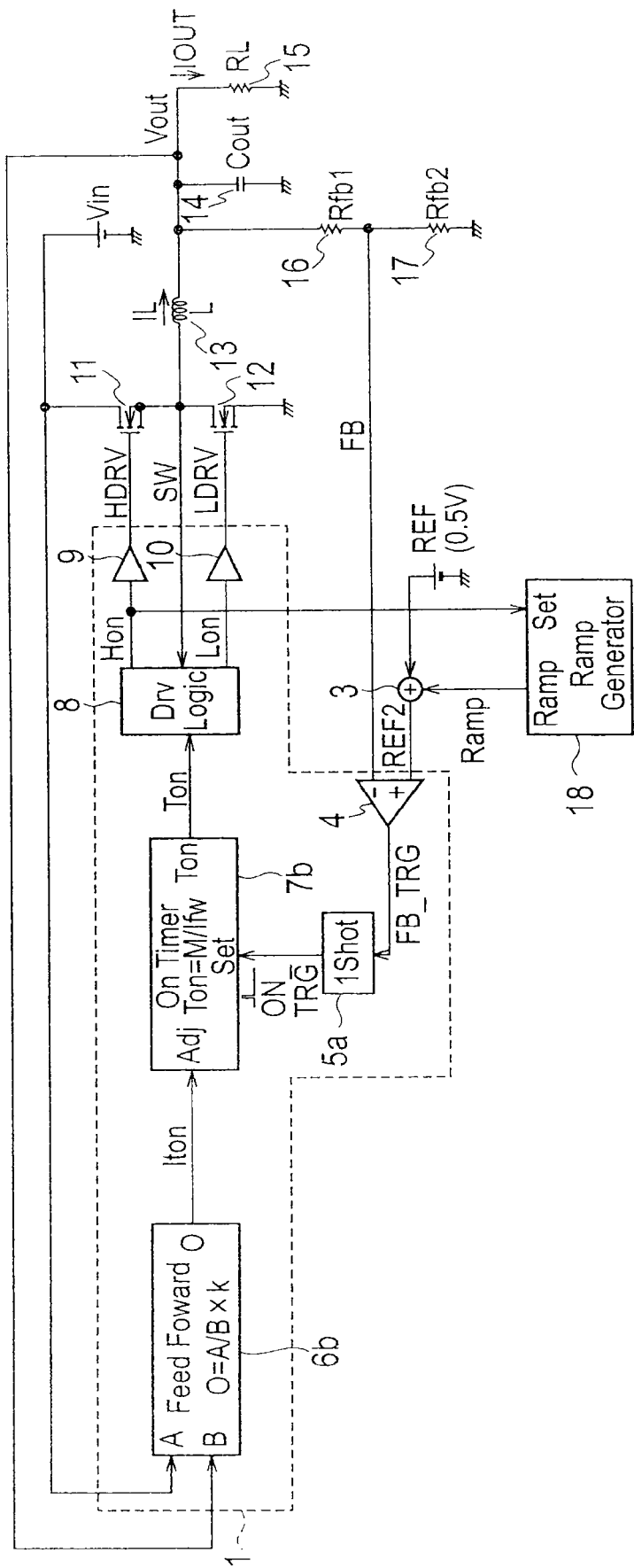
FIG. 1 is a circuit diagram illustrating a switching power source apparatus according to a related art.
Figure 2:
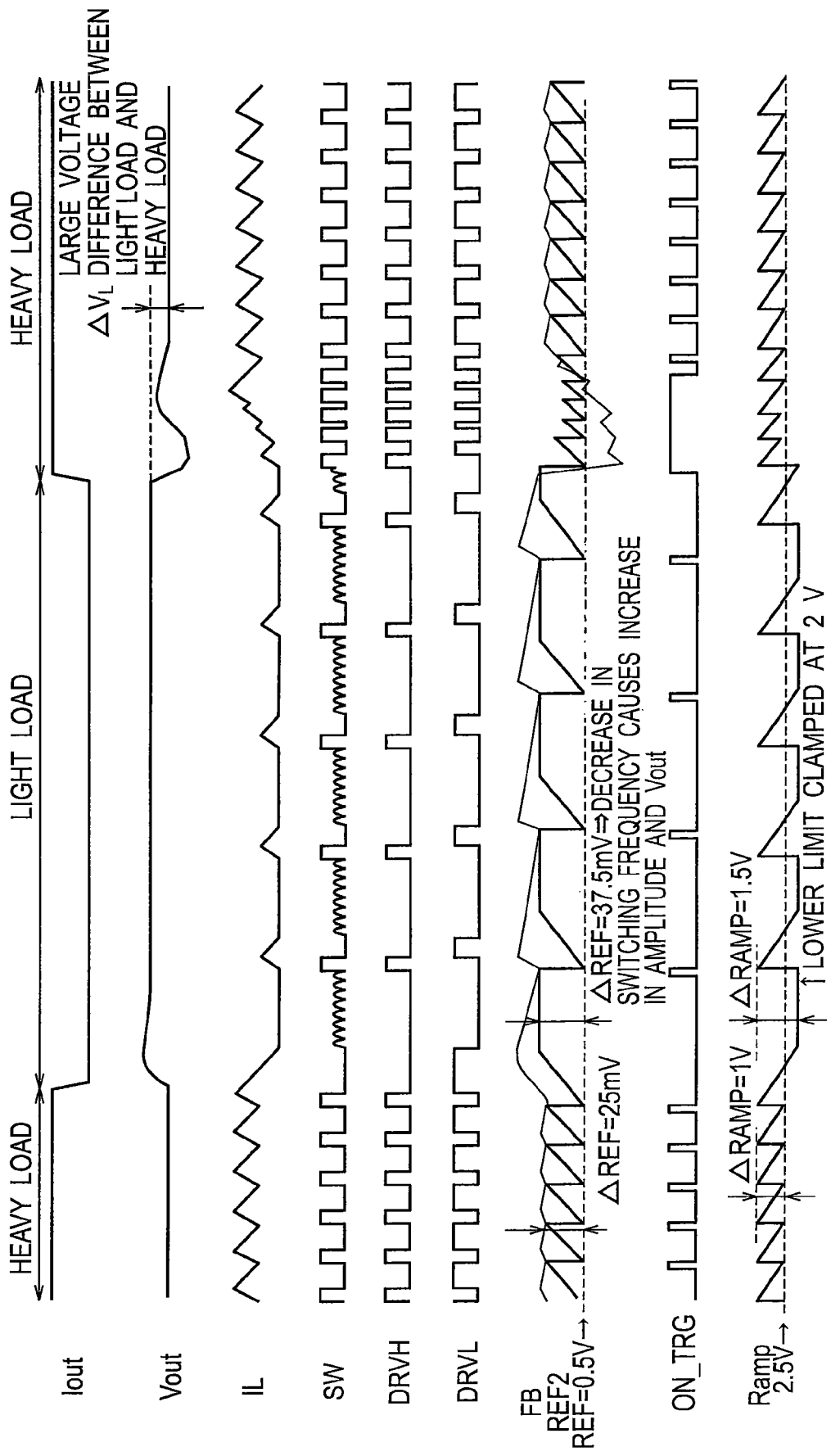
FIG. 2 is a timing chart illustrating operation of the switching power source apparatus of FIG. 1.
Figure 3:
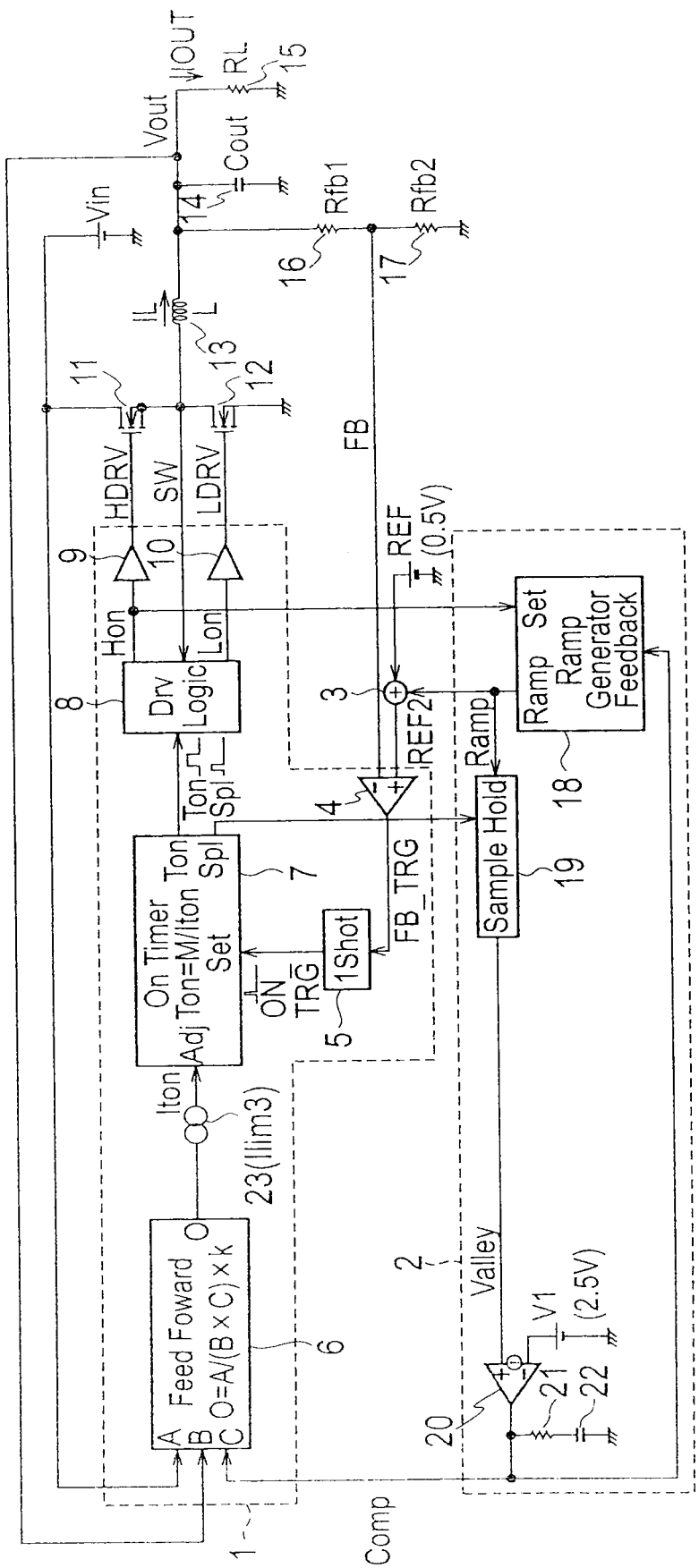
FIG. 3 is a circuit diagram illustrating a switching power source apparatus according to Embodiment 1 of the present invention.

FIG. 3 is a circuit diagram illustrating a switching power source apparatus according to Embodiment 1 of the present invention. Parts of FIG. 3 that are similar to those of the related art of FIG. 1 are represented with like reference numerals to avoid a repetition of explanation.

In FIG. 3, the switching power source apparatus according to the present embodiment includes a first feedback controller 1, a second feedback controller 2, a superposing circuit 3, a high-side MOSFET 11, a low-side MOSFET 12, an inductor 13, an output smoothing capacitor 14, an output load 15, and feedback resistors 16 and 17.

The first feedback controller 1 includes a feedback comparator 4, a one-shot circuit 5, a feedforward circuit 6, an ON timer 7, a drive logic 8, a high-side driver 9, a low-side driver 10, and a current limiter 23.

The second feedback controller 2 includes a ramp generator 18, a sample and hold circuit 19, an error amplifier 20, a phase compensation resistor 21, and a phase compensation capacitor 22.

The switching power source apparatus of the present embodiment principally differs from the switching power source apparatus of the related art illustrated in FIG. 1 in that the apparatus of the present embodiment additionally has the second feedback controller 2 and current limiter 23.

The high-side MOSFET 11 corresponds to the high-side switch stipulated in the claims. A drain of the high-side MOSFET 11 is connected to an input voltage Vin and a source thereof is connected to a drain of the low-side MOSFET 12 and through the inductor 13 to the output load 15. The switching power source apparatus according to the present embodiment carries out switching operation of the high- and low-side MOSFETs 11 and 12, to convert the input voltage Vin into a predetermined output voltage Vout supplied to the output load 15.

The first feedback controller 1 acts as a major loop to handle the output load 15 that dynamically changes. If the output load 15 suddenly changes from light load to heavy load, the first feedback controller 1 operates at once without using the error amplifier 20, to minimize a change in the output voltage Vout.

On the other hand, the second feedback controller 2 acts as a minor loop to detect an amplitude of a ramp signal Ramp generated by the ramp generator 18 and optimize an ON width of the high-side MOSFET 11 in such a way as to keep constant the amplitude of the ramp signal Ramp without regard to an output load current Iout. This results in keeping constant a switching frequency Fsw of the high-side MOSFET 11. With this control, the peak of a second reference voltage REF2 is always kept constant with respect to a static load variation, thereby remarkably improving the load regulation characteristic of the switching power source apparatus without sacrificing control stability. Consequently, the present embodiment solves the load regulation deteriorating problem of the related art.

Figure 4:
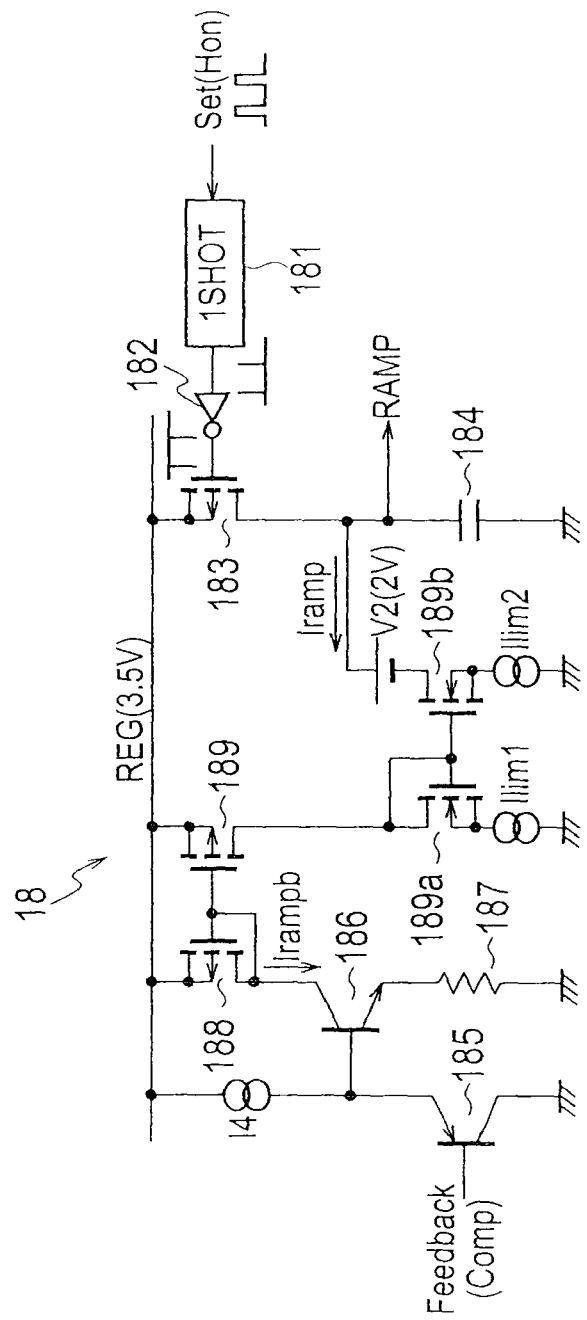
FIG. 4 is a circuit diagram illustrating a ramp generator arranged in the switching power source apparatus of FIG. 3.

The ramp generator 18 corresponds to the ramp signal generator stipulated in the claims and generates the ramp signal Ramp in synchronization with the switching frequency of the high-side MOSFET 11. FIG. 4 is a circuit diagram illustrating the details of the ramp generator 18. In FIG. 4, the ramp generator 18 includes a one-shot circuit 181, an inverter 182, a p-channel MOSFET 183, a capacitor 184, a pnp transistor 185, an npn transistor 186, a resistor 187, a constant current source I4, p-channel MOSFETs 188 and 189, n-channel MOSFETs 189a and 189b, current limiters Ilim1 and Ilim2, and a lower limit clamping voltage V2.

The pnp transistor 185, npn transistor 186, resistor 187, and constant current source I4 form a voltage-current converter that converts the voltage of an amplitude signal Comp into a current Irampb. The p-channel MOSFETs 188 and 189 form a p-channel current mirror circuit. The n-channel MOSFETs 189a and 189b and current limiters Ilim1 and Ilim2 form a current limiter.

The one-shot circuit 181 receives a drive signal Hon from the a drive logic 8, and when the drive signal Hon changes to high, turns on the p-channel MOSFET 183 through the inverter 182 for a very short period such as about 100 ns, thereby charging the capacitor 184 to a power source voltage REG at once.

When the p-channel MOSFET 183 is turned off, the capacitor 184 is gradually discharged by a discharge current Iramp created according to the amplitude signal Comp.

In a normal load zone, the voltage of the amplitude signal Comp is sufficiently high and the value of the current Irampb is large, and therefore, the discharge current Iramp is limited by the current limiter Ilim2 to a given value. On the other hand, in a light load zone in which the discharge current Iramp is lower than the current limiter Ilim2, the discharge current Iramp changes in response to a decrease in the voltage of the amplitude signal Comp.

Namely, the ramp generator 18 controls, according to the amplitude signal Comp generated by an amplitude signal generator to be explained later, the inclination of the ramp signal Ramp so that the amplitude of the ramp signal Ramp may keep a given value.

In this way, the ramp generator 18 generates the ramp signal Ramp by assuming a ripple signal due to ESR and outputs the ramp signal Ramp to the superposing circuit 3 and sample and hold circuit 19.

The superposing circuit 3 corresponds to the first superposing circuit stipulated in the claims. The superposing circuit 3 generates a second ramp signal that has a positive inclination and corresponds to the amplitude and frequency of the ramp signal Ramp generated by the ramp generator 18 and superposes the second ramp signal on a first reference voltage REF (0.5 V), to generate a superposed signal (second reference voltage) REF2.

Figure 5:
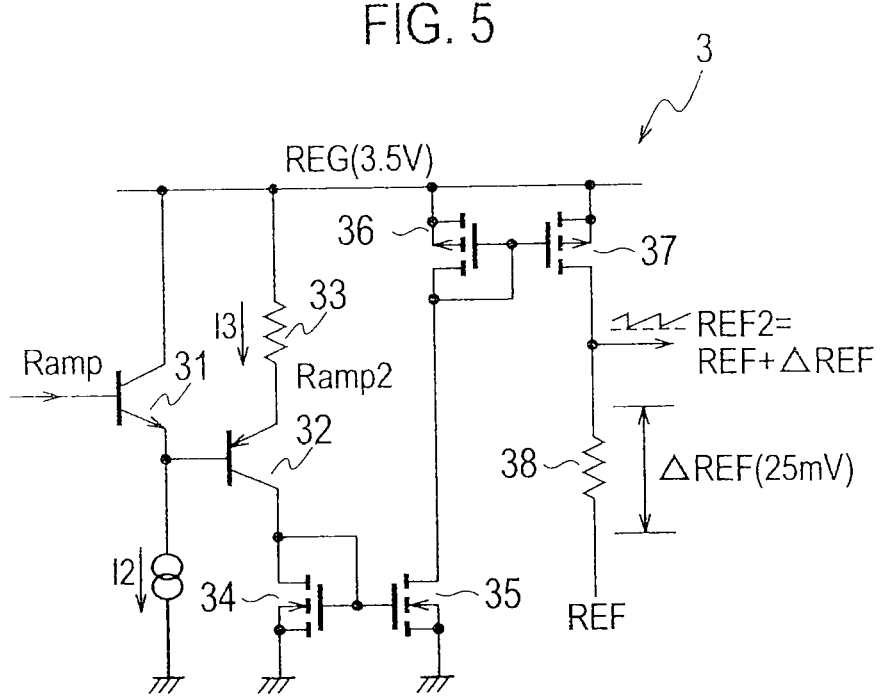
FIG. 5 is a circuit diagram illustrating a superposing circuit arranged in the switching power source apparatus of FIG. 3.

FIG. 5 is a circuit diagram illustrating the details of the superposing circuit 3. In FIG. 5, the superposing circuit 3 includes an npn transistor 31, a pnp transistor 32, a resistor 33, n-channel MOSFETs 34 and 35, p-channel MOSFETs 36 and 37, a resistor 38, and a constant current source I2.

The ramp signal Ramp generated by the ramp generator 18 is received by a buffer circuit consisting of the npn transistor 31 and pnp transistor 32. The buffer circuit carries out impedance conversion on the ramp signal Ramp, so that an emitter of the pnp transistor 32 outputs the second ramp signal Ramp2 whose voltage level is substantially equal to that of the ramp signal Ramp. As a result, both ends of the resistor 33 cause a potential difference of (REG−Ramp2) to generate a current signal I3 corresponding to a change in the ramp signal Ramp. The current signal I3 passes through a current mirror circuit of the n-channel MOSFETs 34 and 35 and a current mirror circuit of the p-channel MOSFETs 36 and 37 and is converted into a voltage by the resistor 38.

In this way, at a high-potential terminal of the resistor 38, the superposing circuit 3 superposes the second ramp signal Ramp2 having a positive inclination corresponding to the ramp signal Ramp on the first reference voltage REF that is a stable DC voltage, to generate the second reference voltage REF2 (corresponding to the first superposed signal stipulated in the claims) and output the signal REF2 to a positive input terminal of the feedback comparator 4.

The sample and hold circuit 19, error amplifier 20, phase compensation resistor 21, and phase compensation capacitor 22 arranged in the second feedback controller 2 correspond to the amplitude signal generator stipulated in the claims and generate the amplitude signal Comp corresponding to an amplitude of the ramp signal Ramp generated by the ramp generator 18.

Figure 6:
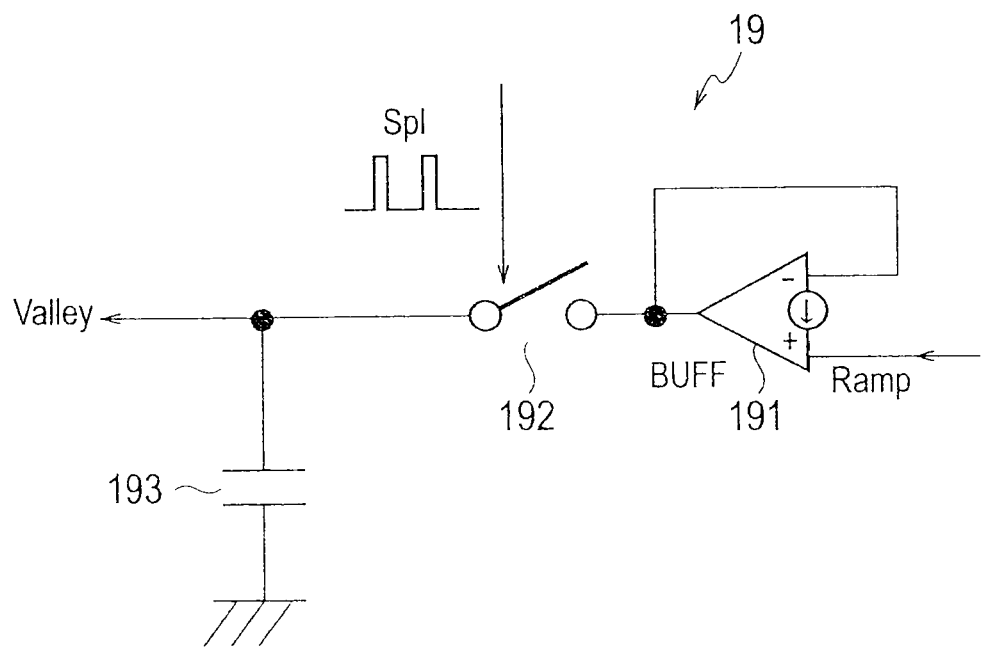
FIG. 6 is a circuit diagram illustrating a sample and hold circuit arranged in the switching power source apparatus of FIG. 3.

The sample and hold circuit 19 holds a valley voltage of the ramp signal Ramp generated by the ramp generator 18. FIG. 6 is a circuit diagram illustrating the details of the sample and hold circuit 19. In FIG. 6, the sample and hold circuit 19 includes a buffer 191, a switch 192, and a capacitor 193.

The buffer 191 outputs an impedance-converted signal of the ramp signal Ramp. When the ramp signal Ramp reaches a valley voltage Valley, the switch 192 turns on for a predetermined sampling period in response to a sampling signal Spl from the ON timer 7, to charge the capacitor 193. Accordingly, the capacitor 193 holds the valley voltage Valley of the ramp signal Ramp until the next sampling period.

The error amplifier 20 compares the valley voltage Valley held by the sample and hold circuit 19 with a reference voltage V1, generates an error amplified signal according to a result of the comparison, and outputs the error amplified signal as the amplitude signal Comp. Namely, the error amplifier 20 compares the valley voltage Valley with the reference voltage V1 and outputs the amplitude signal (error amplified signal) Comp, which is phase-compensated by the resistor 21 and capacitor 22 and is sent to the feedforward circuit 6 and a feedback terminal of the ramp generator 18.

The first feedback controller 1 corresponds to the controller stipulated in the claims. According to the ramp signal Ramp generated by the ramp generator 18, the feedback signal FB corresponding to the output voltage Vout, and the first reference voltage REF, the first feedback controller 1 controls the ON timing of the high-side MOSFET 11. At the same time, the first feedback controller 1 controls the ON width of the high-side MOSFET 11 according to the amplitude signal Comp generated by the amplitude signal generator.

The first feedback controller 1 also uses the input voltage Vin and output voltage Vout when controlling the ON width of the high-side MOSFET 11.

Figure 7:
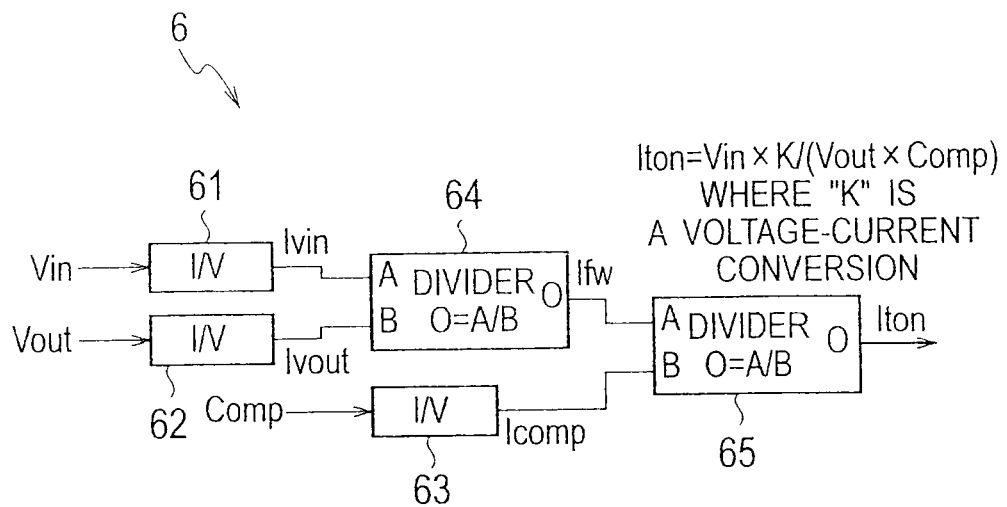
FIG. 7 is a circuit diagram illustrating a feedforward circuit arranged in the switching power source apparatus of FIG. 3.

FIG. 7 is a circuit diagram illustrating the details of the feedforward circuit 6. In FIG. 7, the feedforward circuit 6 includes voltage-current converters 61, 62, and 63 and dividers 64 and 65.

The voltage-current converter 61 converts the input voltage Vin into a current signal Ivin. The voltage-current converter 62 converts the output voltage Vout into a current signal Ivout. The voltage current converter 63 converts the amplitude signal (error amplified voltage) Comp into a current signal Icomp.

The divider 64 divides the current signal Ivin by the current signal Ivout and outputs a current signal Ifw to the divider 65. The divider 65 divides the current signal Ifw by the current signal Icomp and outputs a current signal Iton according to a relationship of Iton=K×Vin/(Vout×Comp), where "K" is a conversion coefficient for converting the input voltage Vin, output voltage Vout, and amplitude signal Comp into the respective current signals. The conversion coefficient K has a dimension inversely proportional to a resistance value.

The feedforward circuit 6 outputs the output current Iton to a terminal Adj of the ON timer 7, the output current Iton being proportional to the input voltage Vin and inversely proportional to the output voltage Vout. With this operation of the feedforward circuit 6, the first feedback controller 1 controls the ON width of the high-side MOSFET 11 in such a way as to maintain the switching frequency of the high-side MOSFET 11 without regard to the input and output conditions. The output current Iton is inversely proportional to the amplitude signal (error amplified signal) Comp from the second feedback controller 2, and therefore, the first feedback controller 1 also controls the ON width of the high-side MOSFET 11 in such a way as to equalize the valley voltage Valley of the ramp signal Ramp with the reference voltage V1.

The first feedback controller 1 with the feedforward circuit 6 uses the amplitude signal Comp from the amplitude signal generator, to control the ON width of the high-side MOSFET 11 so that the amplitude of the ramp signal Ramp generated by the ramp generator 18 keeps a given value.

The feedback comparator 4 compares the feedback voltage FB with the second reference voltage REF2, and if the feedback voltage FB is lower than a peak of the second reference voltage REF2, outputs a signal FB_TRG to the one-shot circuit 5. Based on the signal FB_TRG, the one-shot circuit 5 outputs a signal ON_TRG to a terminal Set of the ON timer 7.

Figure 8:
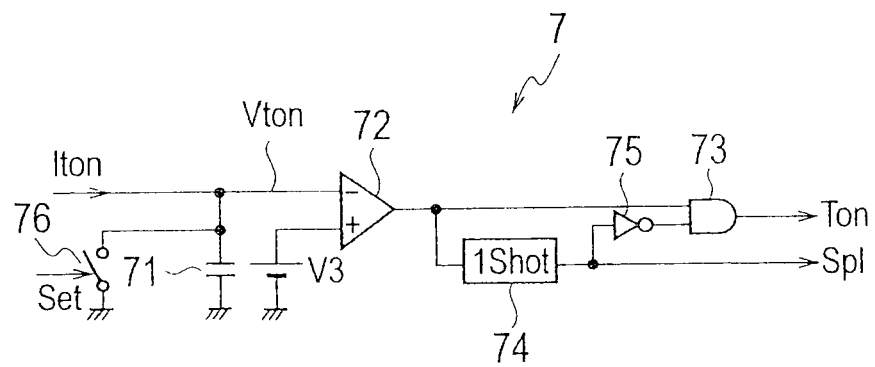
FIG. 8 is a circuit diagram illustrating an ON timer arranged in the switching power source apparatus of FIG. 3.

FIG. 8 is a circuit diagram illustrating the details of the ON timer 7. In FIG. 8, the ON timer 7 includes a capacitor 71, a comparator 72, an AND gate 73, a one-shot circuit 74, an inverter 75, and a switch 76.

Based on the signal ON_TRG from the one-shot circuit 5, the switch 76 turns on for a predetermined period to discharge the capacitor 71 at once. This makes the comparator 72 provide a logical output of high level, and therefore, the one-shot circuit 74 outputs a sampling signal Spl having a predetermined period.

When the sampling period set by the one-shot circuit 74 ends, the AND gate 73 makes an output signal, i.e., the drive logic control signal Ton high level. Thereafter, the capacitor 71 is charged by the feedforward current signal Iton. When the capacitor 71 reaches a threshold voltage V3, the comparator 72 provides a low-level output so that the AND gate 73 changes the drive logic control signal Ton to low level.

The current limiter 23 (Ilim3) limits an upper limit value of the feedforward current signal Iton, to limit a minimum width of the drive logic control signal Ton. Namely, the first feedback controller 1 controls the ON width of the high-side MOSFET 11 so that it may not decrease lower than a predetermined limit value.

Based on the drive logic control signal Ton from the ON timer 7, the drive logic 8 outputs the drive signal Hon for the high-side driver 9 and the drive signal Lon for the low-side driver 10, the drive signals Hon and Lon being in an opposite phase. According to a voltage SW, the drive logic 8 detects that a regenerative period of the inductor 13 ends and the polarity of the current IL passing through the inductor 13 inverts, and then, changes the low-side drive signal Lon from high to low to turn off the low-side MOSFET 12. This prevents an excessive reverse flow of the inductor current IL and a useless loss.

According to the signal Hon from the drive logic 8, the high-side driver 9 drives the gate of the high-side MOSFET 11 to supply energy through the inductor 13 to the output capacitor 14 and output load 15.

According to the signal Lon from the drive logic 8, the low-side driver 10 drives the gate of the low-side MOSFET 12, to turn on the low-side MOSFET 12 in a regenerative period of the inductor current IL after the high-side MOSFET 11 is turned off, thereby reducing a conduction loss.

As is apparent from the above-mentioned operations of the feedback comparator 4, one-shot circuit 5, ON timer 7, drive logic 8, and high-side driver 9, the first feedback controller 1 compares the first superposed signal (second reference voltage) REF2 from the superposing circuit 3 with the feedback signal FB corresponding to the output voltage Vout, and if the feedback signal FB is lower than the first superposed signal REF2, controls the ON timing of the high-side MOSFET 11 so that the high-side MOSFET 11 may turn on.

Figure 9:
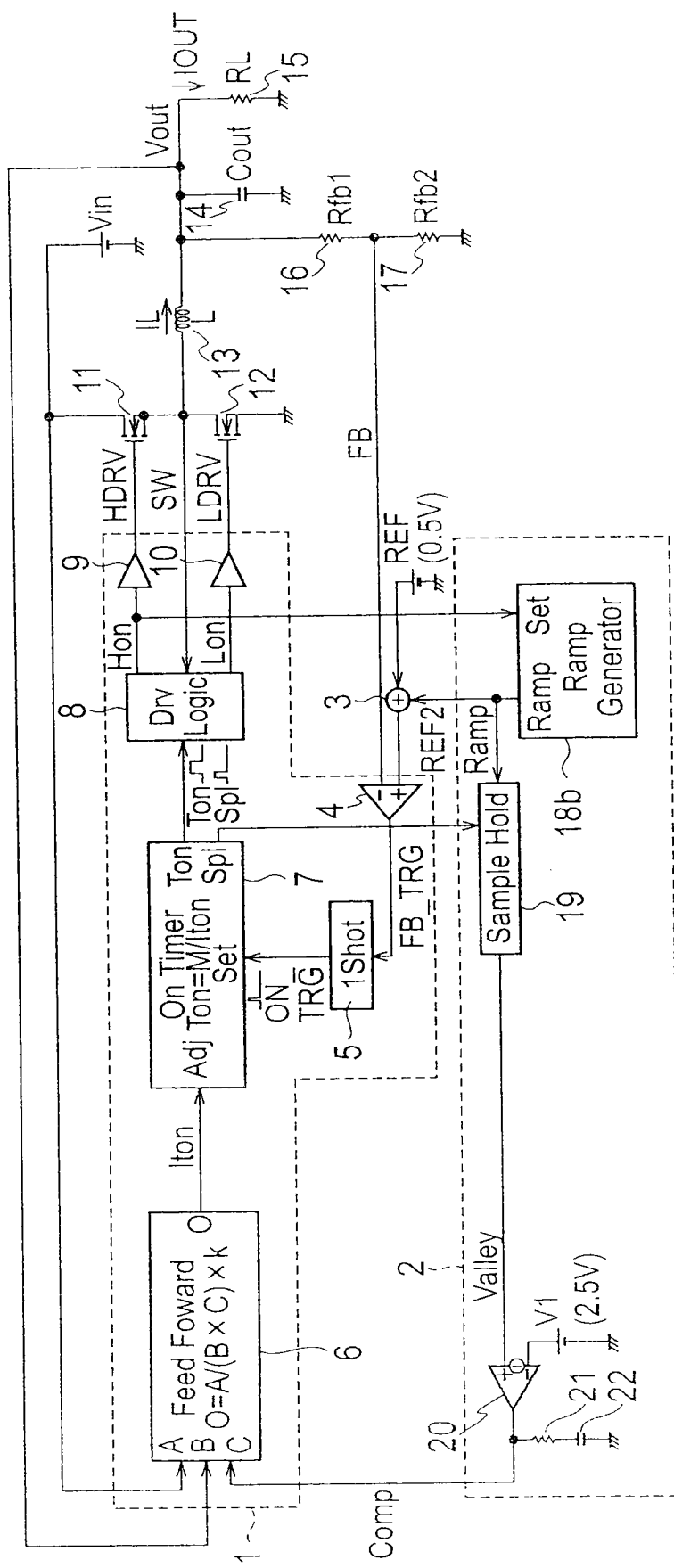
FIG. 9 is a circuit diagram illustrating a switching power source apparatus based on an assumption that if the switching power source apparatus of Embodiment 1 has no feedback of signal Comp to the ramp generator and no current limiter for Iton.

Operation of the switching power source apparatus according to Embodiment 1 with the above-mentioned configuration will be explained. For the sake of clear understanding, the explanation will first be made on an assumption that if the switching power source apparatus of the present embodiment has no feedback of the amplitude signal (error amplified signal) Comp to the ramp generator (18, 18b) and no current limiter 23. FIG. 9 is a circuit diagram illustrating a switching power source apparatus based on the assumption that if the switching power source apparatus of the present embodiment has no feedback of the amplitude signal (error amplified signal) Comp to the ramp generator (18b in FIG. 9) and no current limiter 23.

Figure 10:
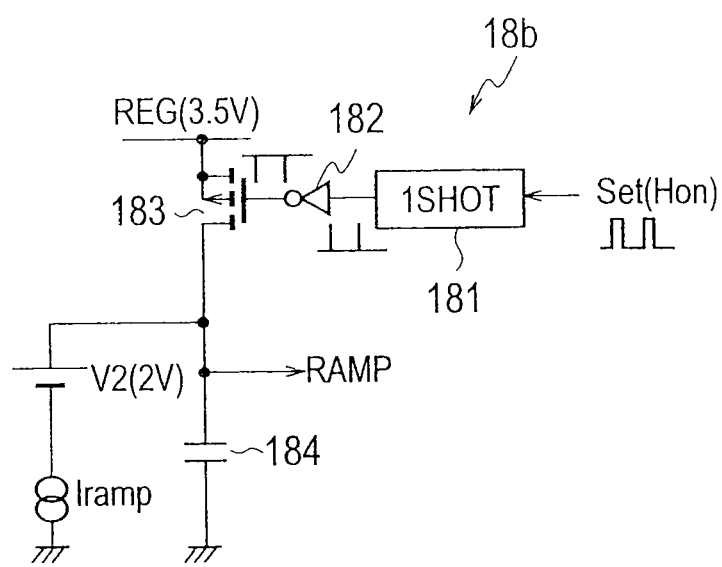
FIG. 10 is a circuit diagram illustrating a ramp generator arranged in the switching power source apparatus of FIG. 9.

Due to the above assumption, the ramp generator 18b of FIGS. 9 and 10 differs from the ramp generator 18 of FIGS. 3 and 4. FIG. 10 is a circuit diagram illustrating the ramp generator 18b arranged in the switching power source apparatus of FIG. 9. In FIG. 10, the ramp generator 18b includes a one-show circuit 181, an inverter 182, a p-channel MOSFET 183, a capacitor 184, a constant current source Iramp, and a lower limit clamping voltage V2.

The one-shot circuit 181 receives the drive signal Hon from the high-side driver 9, and when the drive signal Hon changes to high, turns on the p-channel MOSFET 183 through the inverter 182 for a very short period such as about 100 ns, thereby charging the capacitor 184 to the power source voltage REG at once.

When the p-channel MOSFET 183 is turned off, the capacitor 184 is gradually discharged by the constant current Iramp. As a result, the ramp generator 18b generates the ramp signal Ramp as a quasi-ripple signal of ESR and outputs the ramp signal Ramp to the superposing circuit 3 and sample and hold circuit 19.

Unlike the ramp generator 18 of FIG. 4 that maintains a predetermined amplitude for the ramp signal Ramp by controlling the inclination of the ramp signal Ramp according to the amplitude signal Comp, the ramp generator 18b of FIG. 10 generates the ramp signal Ramp having a constant inclination because the ramp generator 18b employs the constant current source Iramp.

A mechanism of greatly improving the load regulation characteristic of the switching power source apparatus by maintaining the amplitude of the ramp signal Ramp at a constant value will be explained.

Figure 11:
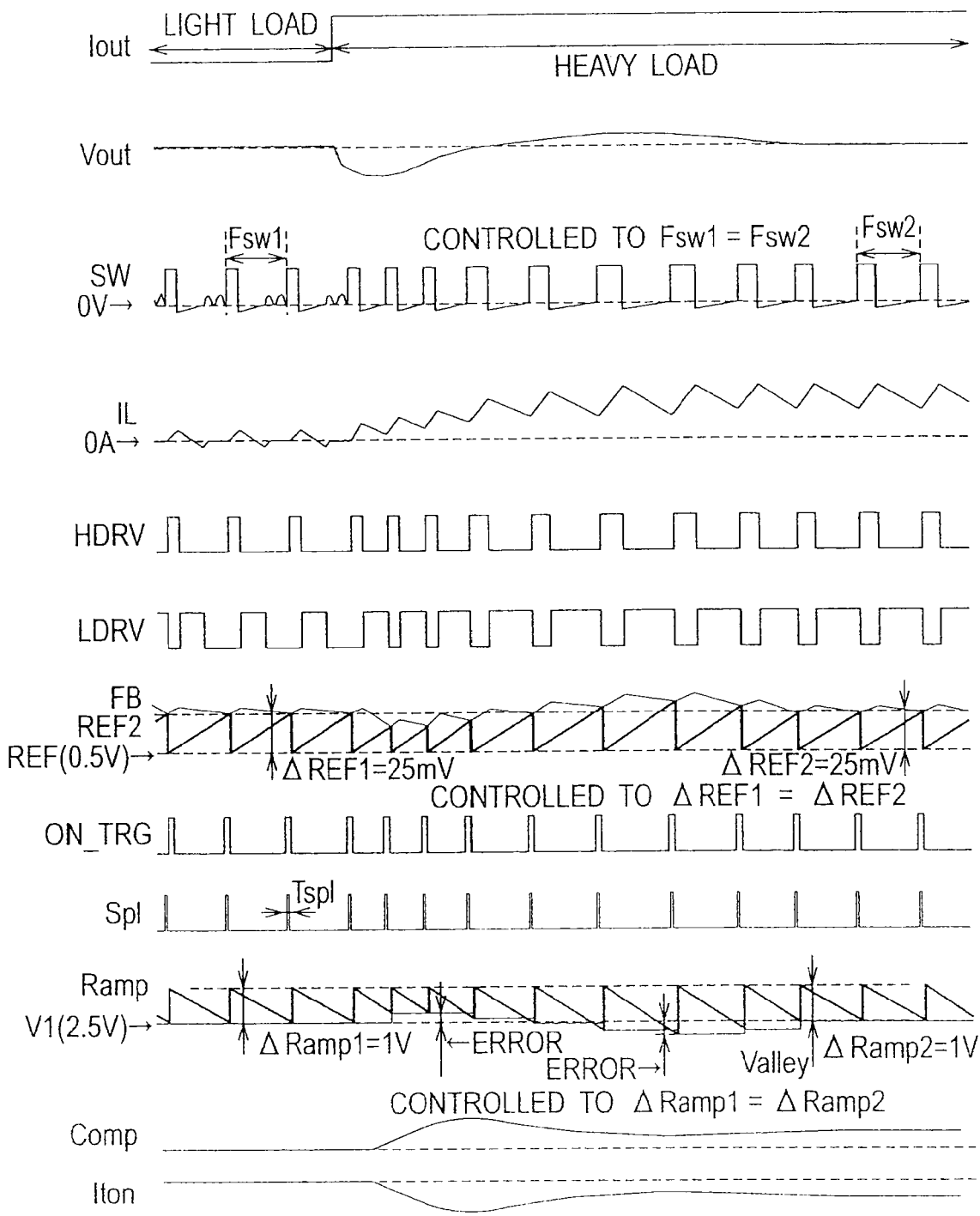
FIG. 11 is a timing chart illustrating operation of the switching power source apparatus of FIG. 9.

FIG. 11 is a timing chart illustrating operation of the switching power source apparatus of FIG. 9. In a case where the output load current Iout passing to the output load 15 is in a light load condition and stable, the sample and hold circuit 19, error amplifier 20, and feedforward circuit 6 operate to equalize the valley voltage Valley of the ramp signal Ramp with the reference voltage V1.

When the output load current Iout suddenly changes to a heavy load condition, the output voltage Vout decreases to decrease the feedback voltage FB. When the feedback voltage FB becomes equal to or lower than the second reference voltage REF2, the one-shot circuit 5 outputs the signal ON_TRG according to a comparison result from the feedback comparator 4. In response to the signal ON_TRG, the high-side MOSFET 11 is turned on at once. At this time, the valley voltage Valley of the ramp signal Ramp increases to produce an error with respect to the reference voltage V1.

To cancel the error, the error amplifier 20 in the second feedback controller 2 increases the amplitude signal Comp. In inverse proportion to the increase of the amplitude signal Comp, the feedforward current Iton from the feedforward circuit 6 decreases. Due to the decrease in the feedforward signal Iton, the ON timer 7 widens the width of the signal Ton.

As a result, the first feedback controller 1 widens the ON width of the high-side MOSFET 11. Namely, based on the amplitude signal Comp from the amplitude signal generator, the first feedback controller 1 widens the ON width of the high-side MOSFET 11 when the amplitude of the ramp signal Ramp generated by the ramp generator 18b is lower than a predetermined value. This operation of the first feedback controller 1 is common between the switching power source apparatuses of FIGS. 3 and 9.

When the ON width of the high-side MOSFET 11 is widened, the switching frequency thereof decreases to maintain an ON duty that is substantially determined by a ratio of the input voltage Vin to the output voltage Vout. Consequently, a switching frequency Fsw1 under light load and a switching frequency Fsw2 under heavy load are equalized to each other. This results in equalizing the valley voltage Valley of the ramp signal Ramp with the reference voltage V1, and therefore, an amplitude of ΔREF superposed on the second reference voltage REF2 is controlled to be constant (depicted as ΔREF1=ΔREF2 in FIG. 11) without regard to the load current Iout.

When the feedback voltage FR increases and the valley voltage Valley of the ramp signal Ramp decreases to cause an error between the valley voltage Valley and the reference voltage V1, the error amplifier 20 of the second feedback controller 2 decreases the amplitude signal Comp to cancel the error. As a result, the first feedback controller 1 narrows the ON width of the high-side MOSFET 11. Namely, according to the amplitude signal Comp from the amplitude signal generator, the first feedback controller 1 narrows the ON width of the high-side MOSFET 11 when the amplitude of the ramp signal Ramp from the ramp generator 18 is equal to or larger than the predetermined value. This operation of the first feedback controller 1 is also common between the switching power source apparatuses of FIGS. 3 and 9.

When the ON width of the high-side MOSFET 11 is narrowed, the switching frequency thereof increases to equalize the switching frequency Fsw1 under light load with the switching frequency Fsw2 under heavy load. This results in equalizing the valley voltage Valley of the ramp signal Ramp with the reference voltage V1, and therefore, the amplitude of ΔREF superposed on the second reference voltage REF2 is controlled to be constant without regard to the load current Iout.

In this way, for a dynamic load variation, the first feedback controller 1, i.e., a major loop quickly responds without using the error amplifier 20, to minimize a change in the output voltage Vout. On the other hand, for a static load variation, the error amplifier 20 is used to keep the amplitude of the ramp signal Ramp at a constant value. As a result, the switching power source apparatus greatly improves the load regulation characteristic thereof without sacrificing control stability.

The switching power source apparatus of FIG. 9 that always keeps constant the switching frequency of the high-side MOSFET 11, however, has a drawback that it is unable to reduce a switching loss in a light load condition by decreasing the switching frequency of the high-side MOSFET 11. This will be explained with reference to FIG. 12.

Figure 12:
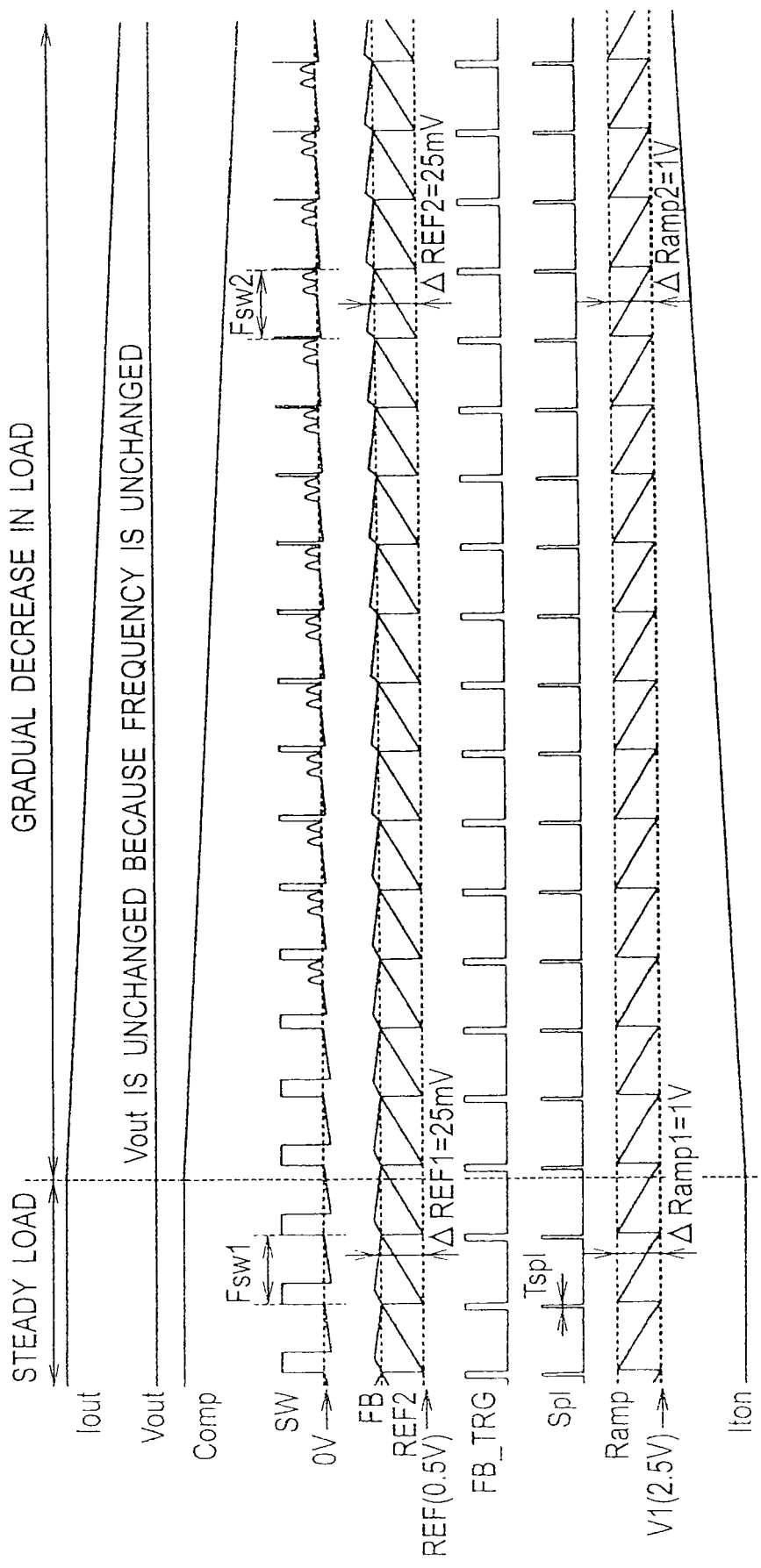
FIG. 12 is a timing chart illustrating another operation of the switching power source apparatus of FIG. 9.

FIG. 12 is a timing chart illustrating operation of the switching power source apparatus of FIG. 9. When the output load current Iout gradually changes from steady load to light load, a time in which the feedback voltage FB decreases below the reference voltage REF2 gradually extends according to the load change. This results in delaying the ON timing of the high-side MOSFET 11, to lower the switching frequency of the high-side MOSFET 11.

If the switching frequency of the high-side MOSFET 11 slightly lowers and if the valley voltage Valley of the ramp signal Ramp decreases below the reference voltage V1, the feedback control is carried out to lower the amplitude signal Comp so as to equalize the valley voltage Valley of the ramp signal Ramp with the reference voltage V1 and narrow the ON width of the high-side MOSFET 11, thereby always keeping constant the switching frequency of the high-side MOSFET 11 irrespective of load variations. This means that the switching power source apparatus of FIG. 9 is incapable of improving efficiency under light load condition. Namely, maintaining the switching frequency of the high-side MOSFET 11 by controlling the ON width of the high-side MOSFET 11 is unable to reduce a switching loss under light load condition.

To solve this problem, the present embodiment adds the current limiter 23 to the circuit of FIG. 9, to limit a minimum ON width of the high-side MOSFET 11, thereby decreasing the switching frequency of the high-side MOSFET 11, reducing a switching loss, and improving efficiency under light load.

Figure 13:
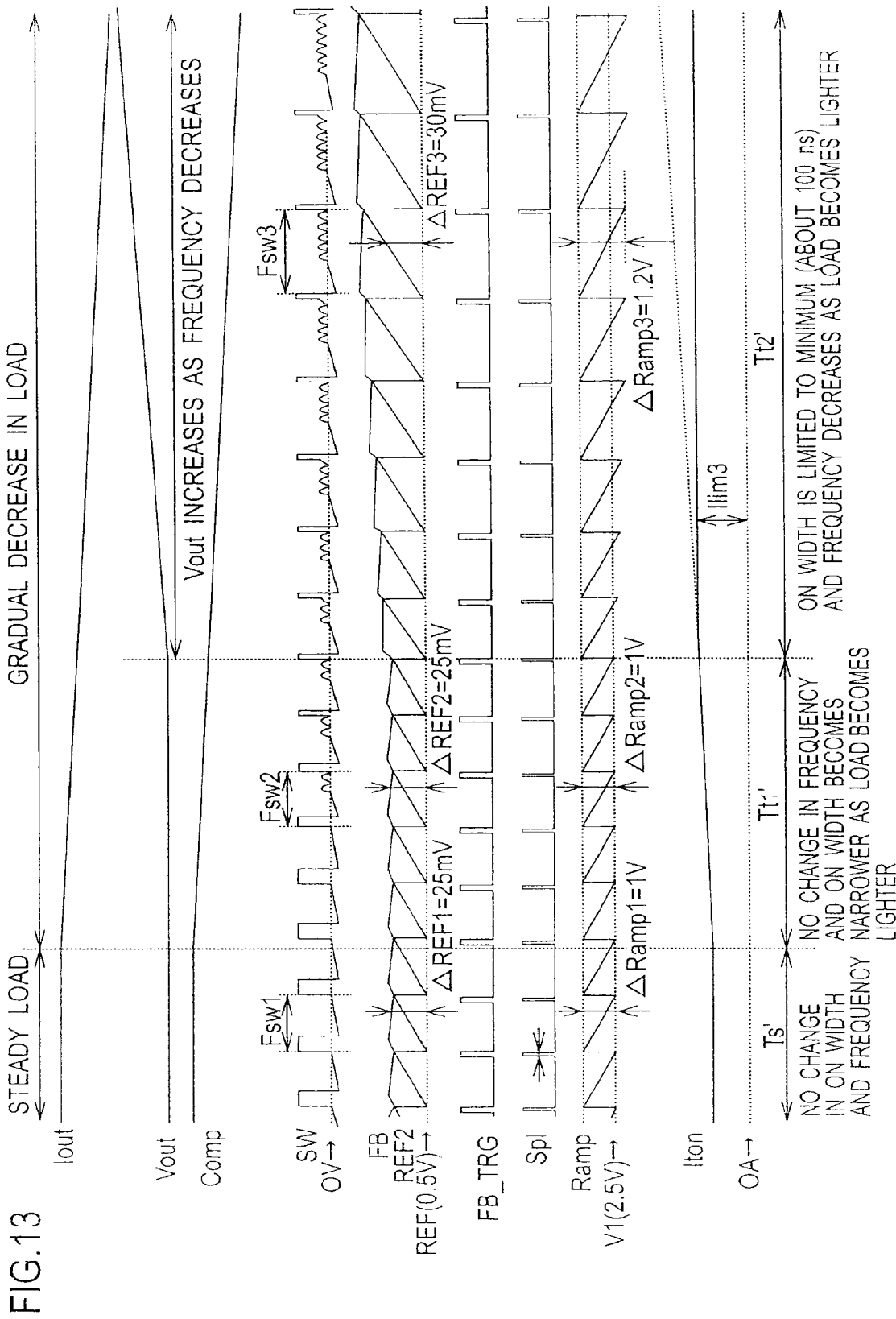
FIG. 13 is a timing chart illustrating operation of the switching power source apparatus of Embodiment 1 without a feedback of signal Comp to the ramp generator.

FIG. 13 is a timing chart illustrating operation of the switching power source apparatus of FIG. 9 on an assumption that the apparatus of FIG. 9 is provided with the current limiter 23 but without feedback of the amplitude signal Comp to the ramp generator 18b, unlike the switching power source apparatus according to Embodiment 1 as illustrated in FIG. 3.

In FIG. 13, the feedforward signal Iton increases as output load decreases. However, the ON width of the high-side MOSFET 11 is limited by a minimum ON width set according to Ilim3 of the current limiter 23, and therefore, the switching frequency of the high-side MOSFET 11 decreases in a very light load zone Tt2'. At this time, the valley voltage Valley of the ramp signal Ramp decreases to increase a signal quantity superposed on the reference voltage REF. This raises a problem of increasing the output voltage Vout in response to the decrease in the output load.

To solve the problem, the switching power source apparatus according to the present embodiment illustrated in FIG. 3 employs the current limiter 23 for the feedforward signal Iton, and in addition, feeds the amplitude signal Comp back to the ramp generator 18. A mechanism of the switching power source apparatus of FIG. 3 of lowering the switching frequency of the high-side MOSFET 11 and reducing a switching loss without sacrificing the load regulation characteristic of the apparatus when output load gradually changes from a steady state to a light state will be explained with reference to FIG. 14.

Figure 14:
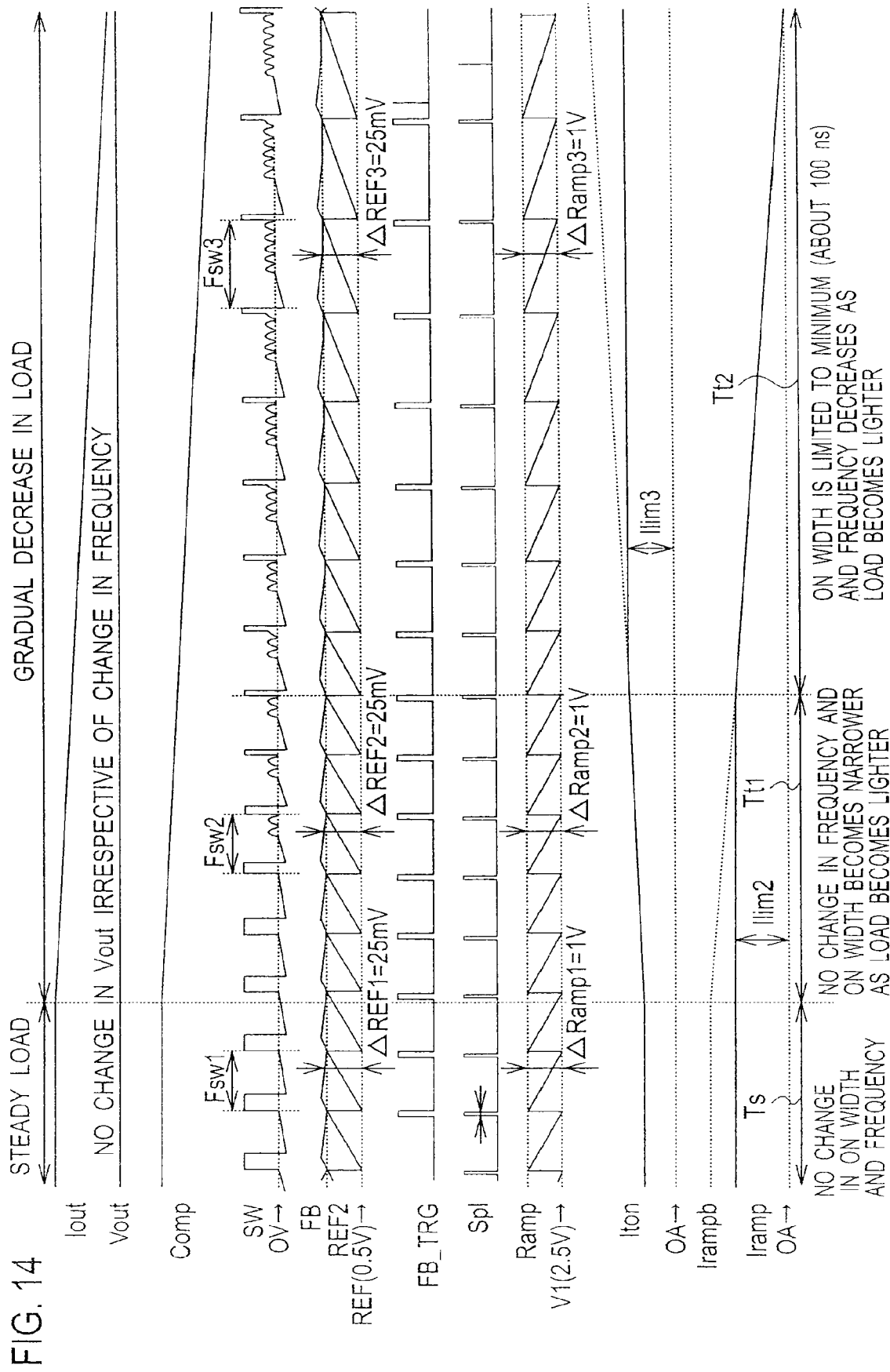
FIG. 14 is a timing chart illustrating operation of the switching power source apparatus of Embodiment 1 illustrated in FIG. 3.

FIG. 14 is a timing chart illustrating operation of the switching power source apparatus according to the present embodiment illustrated in FIG. 3. When load changes relatively gently in a steady load zone Ts, the error amplifier 20 is used to equalize the valley voltage Valley of the ramp signal Ramp with the reference voltage V1.

When steady load gradually shifts to light load in a zone Tt1, the feedforward circuit 6 increases the feedforward current Iton according to the error amplified signal (amplitude signal) Comp representing an error between the valley voltage Valley of the ramp signal Ramp and the reference voltage V1. Then, the first feedback controller 1 narrows the ON width of the high-side MOSFET 11. As a result, the valley voltage Valley of the ramp signal Ramp is equalized with the reference voltage V1 and the switching frequency of the high-side MOSFET 11 is retained.

When the output load further decreases so that the feedforward current Iton is limited by the current limiter 23 (Ilim3) in a zone Tt2, the ON width of the high-side MOSFET 11 does not become narrower any more. At this time, the feedback control is carried out to delay the ON timing of the high-side MOSFET 11 and decrease the switching frequency thereof, thereby keeping constant the output voltage Vout. At this time, if the discharge current Iramp generated according to the error amplified signal (amplitude signal) Comp is equal to or lower than the current limiter Ilim2, the discharge current Iramp decreases as the error amplified signal Comp decreases, to equalize the valley voltage Valley of the ramp signal Ramp with the reference voltage V1. Accordingly, the ramp generator 18 controls the discharge inclination of the ramp signal Ramp so that the inclination becomes lower. Namely, according to the amplitude signal Comp, the ramp generator 18 controls the inclination of the ramp signal Ramp so that the amplitude of the ramp signal Ramp may maintain a predetermined value.

Consequently, the amplitude of the ramp signal Ramp is feedback-controlled to keep the predetermined level. Since the signal quantity superposed on the reference voltage REF is always kept constant even if the switching frequency of the high-side MOSFET 11 decreases, a switching loss can be reduced without sacrificing the load regulation characteristic of the switching power source apparatus.

In this way, the switching power source apparatus according to the present embodiment improves efficiency under light load condition, stably operates even with an output capacitor of small ESR, and realizes a good load regulation characteristic.

For a dynamic load variation such as a sudden load change, the first feedback controller 1, i.e., a major loop quickly responds without using the error amplifier 20, to minimize a change in the output voltage Vout. On the other hand, for a static load variation, the error amplifier 20 is used to keep the amplitude of the ramp signal Ramp at a constant value. As a result, the switching power source apparatus according to the present embodiment greatly improves the load regulation characteristic thereof without sacrificing control stability.

The switching power source apparatus according to Embodiment 1 employs the current limiter 23 to limit a minimum ON width of the high-side MOSFET 11, so that the switching frequency of the high-side MOSFET 11 may decrease under light load condition to reduce a switching loss and improve efficiency.

According to Embodiment 1, the ramp generator 18 controls the inclination of the ramp signal Ramp based on the amplitude signal Comp, so that the amplitude of the ramp signal Ramp may maintain a given value. Accordingly, even if the switching frequency of the high-side MOSFET 11 decreases, the signal quantity superposed on the reference voltage REF is always kept constant, to reduce a switching loss without sacrificing the load regulation characteristic of the switching power source apparatus.

Embodiment 2

Figure 15:
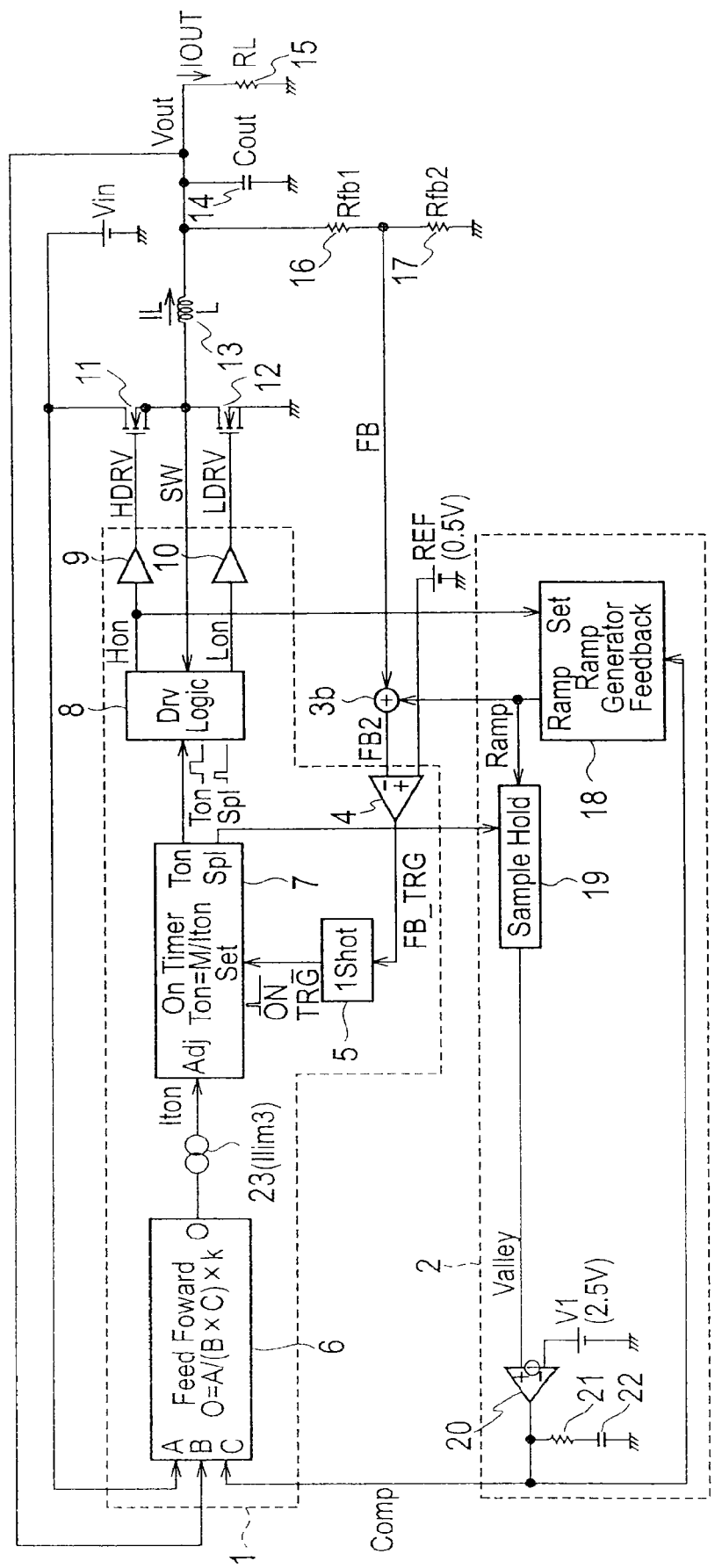
FIG. 15 is a circuit diagram illustrating a switching power source apparatus according to Embodiment 2 of the present invention.

FIG. 15 is a circuit diagram illustrating a switching power source apparatus according to Embodiment 2 of the present invention. Embodiment 2 differs from Embodiment 1 of FIG. 3 in that Embodiment 2 employs a superposing circuit 3b whose configuration and connected location are different from those of the superposing circuit 3 of Embodiment 1. Except this, Embodiment 2 is the same as Embodiment 1, and therefore, the same reference marks as those of Embodiment 1 are used for Embodiment 2, to omit a repetition of explanation.

The superposing circuit 3b corresponds to the second superposing circuit stipulated in the claims. The superposing circuit 3b generates a third ramp signal having a negative inclination corresponding to the amplitude and frequency of the ramp signal Ramp generated by the ramp generator 18 and superposes the third ramp signal on the feedback signal FB, to generate a second superposed signal FB2.

Figure 16:
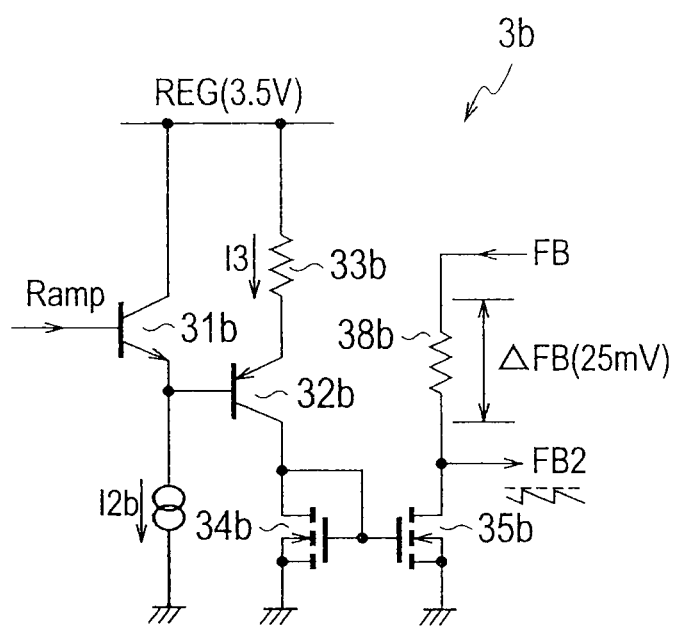
FIG. 16 is a circuit diagram illustrating a superposing circuit arranged in the switching power source apparatus of FIG. 15.

FIG. 16 is a circuit diagram illustrating the details of the superposing circuit 3b. In FIG. 16, the superposing circuit 3b includes an npn transistor 31b, a pnp transistor 32b, a resistor 33b, n-channel MOSFETs 34b and 35b, a resistor 38b, and a constant current source 12b.

The npn transistor 31b and pnp transistor 32b form a buffer circuit to carry out impedance conversion on the ramp signal Ramp from the ramp generator 18, so that an emitter of the pnp transistor 32b provides a signal Ramp2 (third ramp signal) whose voltage level is substantially equal to that of the ramp signal Ramp. As a result, both ends of the resistor 33b provide a potential difference of (REG−Ramp2) to generate a current signal 13 corresponding to a change in the ramp signal Ramp. The current signal 13 is transmitted through a current mirror circuit of the n-channel MOSFETs 34b and 35b and is converted by the resistor 38b into a voltage.

At a low-potential terminal of the resistor 38b, the superposing circuit 3b superposes the third ramp signal having a negative inclination proportional to the ramp signal Ramp on the feedback voltage FB, to generate the second feedback voltage FB2 (corresponding to the second superposed signal as stipulated in the claims) and output the same to the negative input terminal of the feedback comparator 4.

The first feedback controller 1 in the switching power source apparatus of the present embodiment compares the second superposed signal FB2 from the superposing circuit 3b with the first reference voltage REF, and if the second superposed signal FB2 is lower than the first reference voltage REF, turns on the high-side MOSFET 11. The remaining operation of the present embodiment is the same as that of Embodiment 1, and therefore, a repetition of explanation is omitted.

Operation of Embodiment 2 is substantially the same as that of Embodiment 1 except the operation of the superposing circuit 3b that carries out superposing with respect to the feedback signal FB instead of the first reference voltage REF.

Effect of Embodiment 2, therefore, is similar to the effect of Embodiment 1. Although Embodiment 2 employs the different ramp signal superposing technique, it provides the load regulation improving effect and efficiency improving effect under light load, like Embodiment 1. Compared with the superposing circuit 3 of Embodiment 1 illustrated in FIG. 5, the superposing circuit 3b of Embodiment 2 illustrated in FIG. 16 is simpler because the superposing circuit 3b has no current mirror circuit consisting of p-channel MOSFETs.

When packaging a switching power source apparatus into an LSI, it is general to install feedback resistors Rfb1 and Rfb2 (FIG. 15) as external parts to make an output voltage Vout variable. In this regard, Embodiment 2 allows ΔFB (FIG. 16) to be adjustable by selecting the feedback resistors 16 (Rfb1) and 17 (Rfb2), and therefore, is advantageous in terms of versatility.

In summary, the switching power source apparatus according to any embodiment of the present invention improves efficiency under light load, realizes stable operation even with an output capacitor having a small ESR, and secures a good load regulation characteristic.

The switching power source apparatus according to the present invention is applicable to electric equipment that needs a stable power supply.

This application claims benefit of priority under 35USC §119 to Japanese Patent Applications No. 2010-184011, filed on Aug. 19, 2010, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
   a high-side switch connected to an input voltage;
   a ramp signal generator configured to generate a ramp signal in synchronization with a switching frequency of the high-side switch;
   an amplitude signal generator configured to generate an amplitude signal corresponding to an amplitude of the ramp signal;
   a controller configured to control the ON timing of the high-side switch according to the ramp signal, a feedback signal, and a first reference voltage and control the ON width of the high-side switch according to the amplitude signal, wherein
   the ramp signal generator controls the inclination of the ramp signal according to the amplitude signal so that the ramp signal maintains a predetermined amplitude, and
   the controller controls the ON width of the high-side switch so that the ON width does not become narrower than a predetermined limit value; and
   a second superposing circuit configured to generate a third ramp signal having a negative inclination corresponding to the amplitude and frequency of the ramp signal and provide a second superposed signal by superposing the third ramp signal on the feedback signal, wherein
   the controller compares the second superposed signal with the first reference voltage, and if the second superposed signal is lower than the first reference voltage, controls the ON timing of the high-side switch so that the high-side switch turns on.

2. The switching power source apparatus of claim 1, wherein the controller controls, based on the amplitude signal, the ON width of the high-side switch so that the ramp signal maintains a predetermined amplitude.

3. The switching power source apparatus of claim 1, wherein the controller controls, based on the amplitude signal, the ON width of the high-side switch so that the ramp signal maintains a predetermined amplitude.

4. The switching power source apparatus of claim 1, wherein based on the amplitude signal, the controller widen the ON width of the high-side switch if the amplitude of the ramp signal is smaller than a predetermined value and narrow the ON width of the high-side switch if the amplitude of the ramp signal is equal to or larger than the predetermined value.

5. The switching power source apparatus of claim 1, wherein the amplitude signal generator includes:
   a sample and hold circuit configured to hold a valley voltage of the ramp signal; and
   an error amplifier configured to compare the valley voltage with a second reference voltage and generate an error amplified signal as the amplitude signal according to a result of the comparison.

6. The switching power source apparatus of claim 1, wherein the controller controls the ON width of the high-side switch according to the input voltage and an output voltage.

\* \* \* \* \*